(12) United States Patent
Nijland

(10) Patent No.: US 8,746,435 B2
(45) Date of Patent: Jun. 10, 2014

(54) TRANSPORT DEVICE FOR TRANSPORTING A PRODUCT, AND SORTING DEVICE AND METHOD THEREFOR

(75) Inventor: Wilhelm Jan Nijland, Veenendaal (NL)

(73) Assignee: De Greef's Wagen-, Carrosserie- en Machinebouw B.V., Tricht (NL)

( * ) Notice: Subject to any disclaimer, the term of this patent is extended or adjusted under 35 U.S.C. 154(b) by 170 days.

(21) Appl. No.: 13/497,397

(22) PCT Filed: Sep. 20, 2010

(86) PCT No.: PCT/NL2010/050608
§ 371 (c)(1),
(2), (4) Date: Sep. 12, 2012

(87) PCT Pub. No.: WO2011/034432
PCT Pub. Date: Mar. 24, 2011

(65) Prior Publication Data
US 2012/0325618 A1    Dec. 27, 2012

(30) Foreign Application Priority Data
Sep. 21, 2009   (NL) .................................... 2003516

(51) Int. Cl.
*B65G 47/51*      (2006.01)
(52) U.S. Cl.
USPC ............. 198/370.04; 198/370.09; 198/464.1; 198/959
(58) Field of Classification Search
USPC .................. 198/370.03, 370.04, 370.09, 959, 198/469.1, 476.1, 477.1, 803.4, 464.1
See application file for complete search history.

(56) References Cited

U.S. PATENT DOCUMENTS

| | | | | |
|---|---|---|---|---|
| 5,101,982 A | * | 4/1992 | Gentili | 209/556 |
| 5,195,628 A | | 3/1993 | Warkentin | |
| 5,230,394 A | * | 7/1993 | Blanc | 177/145 |
| 5,244,100 A | * | 9/1993 | Regier et al. | 209/556 |
| 5,280,838 A | * | 1/1994 | Blanc | 209/552 |
| 5,306,877 A | * | 4/1994 | Tas | 177/145 |
| 5,611,419 A | * | 3/1997 | LaVars | 198/370.04 |

(Continued)

FOREIGN PATENT DOCUMENTS

| | | |
|---|---|---|
| EP | 0553933 A1 | 8/1993 |
| WO | 2004002861 A1 | 1/2004 |
| WO | 2004067417 A1 | 8/2004 |
| WO | 2007069284 A1 | 6/2007 |

OTHER PUBLICATIONS

The International Search Report and Written Opinion issued in PCT/NL2010/050608 mailed Dec. 20, 2010.

*Primary Examiner* — Leslie A Nicholson, III
*Assistant Examiner* — Keith R Campbell
(74) *Attorney, Agent, or Firm* — Banner & Witcoff, Ltd.

(57) ABSTRACT

A transport device for transporting products and a sorting device provided therewith are disclosed. A transporting method making use of these systems is also disclosed. The transport device according to the exemplary embodiment comprises, a frame engaging means connected to the frame for operatively connecting the transport device to a drive system; and rotatable carrier means connected to the frame for operatively connecting the transport device to a drive system; and a rotatable carrier means connected to the frame for carrying a product, wherein the carrier means is rotatable about a shaft substantially perpendicular to the direction of transport of the product.

17 Claims, 5 Drawing Sheets

(56) References Cited

U.S. PATENT DOCUMENTS

| | | | | |
|---|---|---|---|---|
| 5,626,238 | A * | 5/1997 | Blanc | 209/646 |
| 5,677,516 | A * | 10/1997 | Leverett | 177/52 |
| 6,003,653 | A * | 12/1999 | Kennedy et al. | 198/367 |
| 6,079,542 | A * | 6/2000 | Blood | 198/384 |
| 6,234,297 | B1 * | 5/2001 | Blanc | 198/370.04 |
| 6,374,983 | B1 * | 4/2002 | Morigi | 198/370.07 |
| 7,222,715 | B2 * | 5/2007 | Madden et al. | 198/370.04 |
| 7,395,914 | B2 * | 7/2008 | van Wijngaarden et al. | 198/370.04 |
| 7,410,044 | B2 * | 8/2008 | Kennedy | 198/370.04 |
| 2011/0309004 | A1 * | 12/2011 | Morley | 209/577 |

* cited by examiner

TRANSPORT DEVICE FOR TRANSPORTING A PRODUCT, AND SORTING DEVICE AND METHOD THEREFOR

The present application is a U.S. National Phase filing of International Application No. PCT/NL2010/050608 filed on Sep. 20, 2010, designating the United States of America and claiming priority to Dutch Patent Application No. 2003516 filed on Sep. 21, 2009. The present application claims priority to and the benefit of both the above-identified applications, and both the above-identified applications are incorporated by reference herein in their entireties.

The disclosure herein relates to a transport device with which products, including fruits, can be transported. Somewhat round or spherical products such as apples and tomatoes can be transported with the transport device.

Transport devices for fruit known in practice make use of holders or cups in which a fruit is placed. Owing to the use of such holders diverse types of product can be transported. In practice the products laid in such holders are usually pre-assessed using a weighing or visual inspection such that the transport can take place to the desired position. The fruits are then released in this desired position. A problem which occurs here relates to the use of different apparatuses or machine parts which subsequently have to be matched again to each other. Small imperfections in this matching can cause disruption of or even standstill of the whole line.

One exemplary embodiment provides an improved transport of products such that the whole operation can be performed with a greater efficiency.

This object is achieved with the transport device for transporting products according to the following features:
a frame;
engaging means connected to the frame for operatively connecting the transport device to a drive system; and
a rotatable carrier means connected to the frame for carrying a product, wherein the carrier means are rotatable about a shaft substantially perpendicular to the direction of transport of the product.

By providing a frame on which engaging means are provided the transport device or trolley according to an exemplary embodiment can be connected to a drive system. Such a drive system is for instance a chain. This chain is driven so that products are transported. The engaging means are operatively connected in use to this drive system such that the frame of the transport device co-displaces during transport. The products are here supported and carried along by the carrier means, wherein the carrier means are rotatable about a shaft substantially perpendicular to the direction of transport of the products. This means that the carrier means, on the upper side of which a product or fruit can be placed, are rotatable on this supporting side in the same direction as the direction of transport of the product or, conversely, in opposite direction thereto. The product will rotate due to rotation of the carrier means.

The carrier means are, in one exemplary embodiment, a diabolo-type carrier. The products are hereby supported during transport. In addition, it is also possible by rotating the diabolo to also bring about rotation of the product during transport. This is advantageous for instance if a visual inspection of the product has to be carried out. Such a visual inspection can then be used for classification and additional sorting of the product.

Rotation means can be provided for rotating the diabolo-type carriers. For the purpose of this rotation the diabolo-type carriers run for instance over a belt or rope with which the rotation speed of the diabolo can be controlled.

In an exemplary embodiment, a transport line or transport path can be realized in a modular manner. Rotation of the diabolo-type carriers allows an inspection or measurement of the transported products without a separate system or apparatus being required for this purpose. This increases the efficiency of the whole transport path, since the number of components can remain limited. In addition, matching of machine parts or separate apparatuses to each other is necessary to lesser degree or is no longer necessary at all. This reduces the complexity of such a line. Owing to the modular construction of the transport device, a whole transport path or transport line can be assembled in relatively simple matter on the basis of the desired specifications.

In one exemplary embodiment, the transporting position of a product is defined by the space between two adjacent diabolo-type carriers. During transport the products therefore lie as it were to some extent between these two adjacent diabolo-type carriers.

In an exemplary embodiment the frame is provided with a carrier means on each side thereof.

An efficient transport of products is made possible by providing a frame, which is mountable on a drive system, with a carrier means on each side. In this embodiment two transport paths are realized using one transport device. A large quantity of products can be transported here with a limited amount of equipment and means. An additional advantage of using two transport paths is that this makes it possible in effective manner to weigh the products adjacently of the drive system. This enables a simpler and more efficient weighing.

In another exemplary embodiment, the engaging means are provided with a snap mechanism for engaging thereof on the drive system.

In another exemplary embodiment, by providing a snap system the frame of the transport device can be secured in relatively simple manner to the drive system. In one embodiment, the drive system is a chain, and the snap system comprises one or more hook-like parts which fit around a link of such a chain. This greatly simplifies the assembly of a transport device. An additional advantage of this simple mounting and assembly is that it is also relatively simple to place the transport devices at a different mutual pitch in the whole transport path. This is for instance advantageous in the case the whole transport path will be used for another type of product or fruit having different dimensions.

In another exemplary embodiment, the drive system is provided with an angle of inclination, wherein the angle of inclination lies in the range of 0-15°, and more particularly in the range of 5-10°.

Providing the drive system with an angle of inclination, wherein the drive system runs upward to some extent in the direction of transport, achieves that the products are singulated in correct manner. As a result of this angle of inclination two products possibly lying together roll to an empty transport device or trolley. It has been found that an angle of 5 to 10° works particularly advantageously here. It has been found more particularly that an angle of about 7° works particularly advantageously for a large number of apple varieties. Such an angle of inclination can be provided along the whole transport path, although such an angle of inclination is applied at the beginning thereof for the purpose of singulating the products. The width of the carrier means, for instance the diabolos, is chosen and adapted to the dimensions of the product for transporting such that two products lying together roll laterally off the carrier means. The step of singulating the products is hereby further improved.

In another exemplary embodiment, the transport device comprises a camera for detecting and/or assessing the product.

By combining the transport device operatively with a camera or camera system it is possible to detect whether a product is present, for instance for the purpose of counting the number of products. Alternatively or in combination, a visual inspection can also be performed in automatic manner. Such a visual inspection can for instance serve for the purpose of classifying and sorting products. In another exemplary embodiment, the carrier means are formed by diabolos. Using rotation means, for instance in the form of ropes or belts, the diabolos are rotated at the position of the camera or camera system. Due to the rotation of the diabolos the product will rotate during transport and be carried under or past a camera or camera system. It is otherwise also possible to cause the camera or camera system to move relative to the transport device. Owing to the rotation of the product on the transport device according to another exemplary embodiment, the inspection can take place in simple manner on the transport device.

In another exemplary embodiment, the transport device comprises a weighing system for weighing the product.

By providing a weighing system the product can be weighed during transport with the transport device in another exemplary embodiment. This has the same advantages as stated in respect of the camera or the camera system.

The weighing system can be provided with a type of sliding element with which the transport device can be operatively connected to a weighing platform during weighing. These sliding elements are moved over the weighing platform during transport so that the weighing can be performed during the transport.

The weighing system is provided per weighing system with three sliding elements which are carried over a weighing platform. Such a three-point weighing results in a stable and constant measurement. If desired, the measurement can be repeated in order to further increase the reliability thereof. The weighing system can be formed such that the center of gravity of the product lies within the surface area defined by the three sliding elements, and in the center thereof. An optimal distribution of the weight of the product for measuring over the sliding elements is hereby achieved such that the accuracy of the measurement is increased.

It has been found that particularly the central positioning of the product within the plane defined by the three sliding elements results in an accurate and reproducible measurement which, surprisingly, enables a significant improvement in the weighing process and optionally the subsequent sorting. In the case of sorting, the sorting process is hereby improved. A particular advantage of the system according to the one exemplary embodiment is that the improved weighing can be performed with a relatively simple system requiring a relatively limited number of components. A reliable and cost-effective system is hereby obtained. Unnecessary movements and contact with the product are also hereby avoided. Undesirable damage to the product is thus prevented as far as possible.

The weighing system can be provided with a pivot arm which is connected to the frame and with which a carrier means is movable to some extent in a vertical direction. By enabling some movement in a vertical direction using this pivot arm the weight of the product or the fruit will rest on the weighing platform so that a measurement can be performed on the product. In one embodiment the product is carried by a single carrier body, for instance in the form of diabolo, during the weighing using a weighing arm or weighing frame.

Using the pivot arm the diabolo is provided for movement to some extent in vertical direction relative to the frame by enabling a rotation of the pivot arm. Using a rotation movement instead of a translating movement for weighing purposes achieves that the friction resulting from this movement remains minimal. The measurement of the product hereby becomes more accurate. In addition, a rotation movement entails a reduced risk of soiling and the resulting inaccuracies in the measurement. It is further the case that the remaining frictional component is distributed more uniformly over the sliding elements. This contributes further toward greater accuracy of the measurement. In addition to a more accurate measurement, the above stated measures and effects also enable a higher processing speed such that the transport speed of the products can be increased without detracting from the accuracy of a measurement.

The sliding elements or contact points are provided here on this weighing frame. This achieves that a product for weighing rests on a single diabolo, wherein it is held in position using the weighing frame. Some freedom of movement of the diabolo with product is realized in vertical direction due to the pivot arm. This achieves that the whole weight of the diabolo with product comes to lie on the weighing platform. The weight of the relevant product can then be determined in relatively simple manner.

The pivot arm can be provided with a product-friendly form such that a product cannot become trapped during the return movement of the transport device after release of a product. Such a product-friendly form is also realized for the weighing frame connected to the pivot arm, by providing this frame with a number of fingers, wherein the length and position of these fingers is adapted to the usual dimensions of the product for transporting and weighing. Such fingers form a contact element for holding the product for measuring on a maximum of one carrier means. Holding the product on one carrier means, which in one embodiment is a diabolo, using these contact elements achieves that a reliable measurement can be obtained, since for weighing purposes the relevant diabolo with product is uncoupled from the rest of the transport path. It is otherwise also possible according to one exemplary embodiment to have a product carried by a single carrier element, such as a diabolo, during the whole of the transport.

In another exemplary embodiment, the transport device comprises a release mechanism for releasing the product.

Using the transport device the products are transported and subsequently released at a desired position. Such a position is for instance a table, belt or water channel. The desired position is determined for instance by using the camera and/or weighing. At the desired position the release mechanism is operated, for instance using and electromagnetically controlled rocker construction. By releasing a handle of the release mechanism the diabolo or the carrier body with the product positioned thereon will rotate around an axis extending substantially in the direction of transport of the product. This achieves that the product rolls off the carrier body at the desired position. During release a brush, slide plate or collecting table can for instance be used. In the case of a transport device with two tracks or paths it is possible according to one exemplary embodiment to allow the products to roll off the carrier body to the same side or, if desired, to allow the products to roll in different directions. In the case of further parallel transport paths and associated transport devices, products can for instance be released onto a so-called discharge belt for further transport of the products.

The release mechanism can be provided with a pusher element for stimulating a tilting movement for the purpose of releasing the product. An impulse or impetus is hereby given in active manner for the purpose of starting the tilting of the carrier body around the rotation shaft. This achieves that the carrier body actually releases the product at the desired position.

It has been found that the pusher element brings about a good release at the desired position. Sorting errors, among others, are hereby avoided. It has also been found here that the pusher element according to one exemplary embodiment displays a high measure of reliability.

Another exemplary embodiment, also relates to a sorting device for sorting products, comprising a number of transport devices as described above.

Such a sorting device has the same effects and advantages as described for the transport device. The sorting device can be provided with a control system for controlling the sorting device having a number of transport devices. It is for instance hereby possible to use the measurements with the camera and/or weighing system for the purpose of determining the desired release position and to subsequently activate a release mechanism at this desired release position for the relevant product. A transport and sorting system is hereby obtained in efficient manner.

Another exemplary embodiment relates to a method for transporting and/or sorting products, comprising of providing a transport device and/or a sorting device as described above.

Such a method provides the same effects and advantages as described for the transport device and/or sorting device.

Further advantages, features and details of the present disclosure are elucidated on the basis of exemplary embodiments thereof, wherein reference is made to the accompanying drawings, in which.

Figure 2:
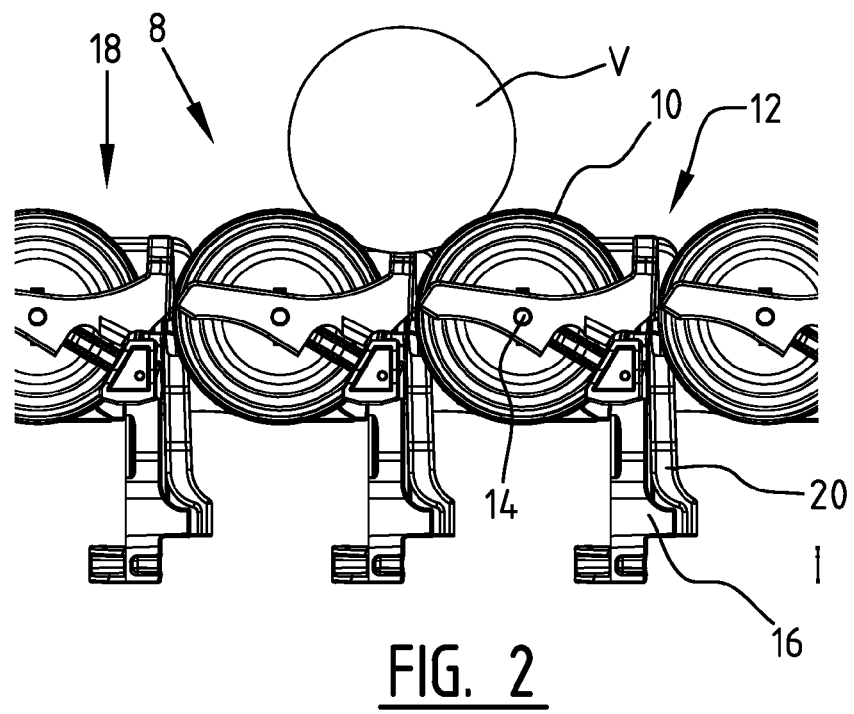
FIG. 2 is a side view of an exemplary embodiment in a rotation position for a measurement.
Figure 4A:
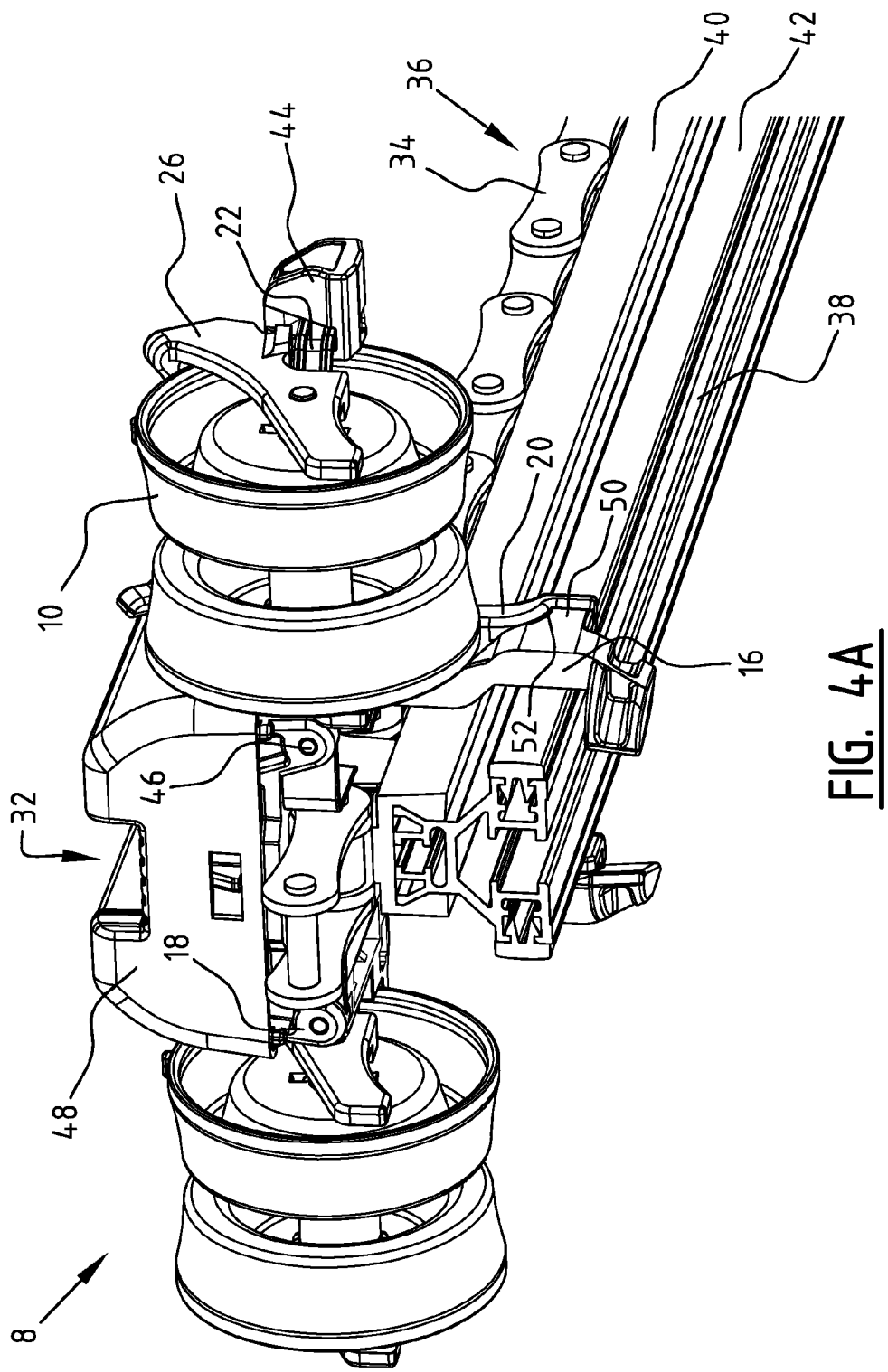

FIGS. 4A, B and C are detail views of the device of FIG. 2; and

Figure 5:
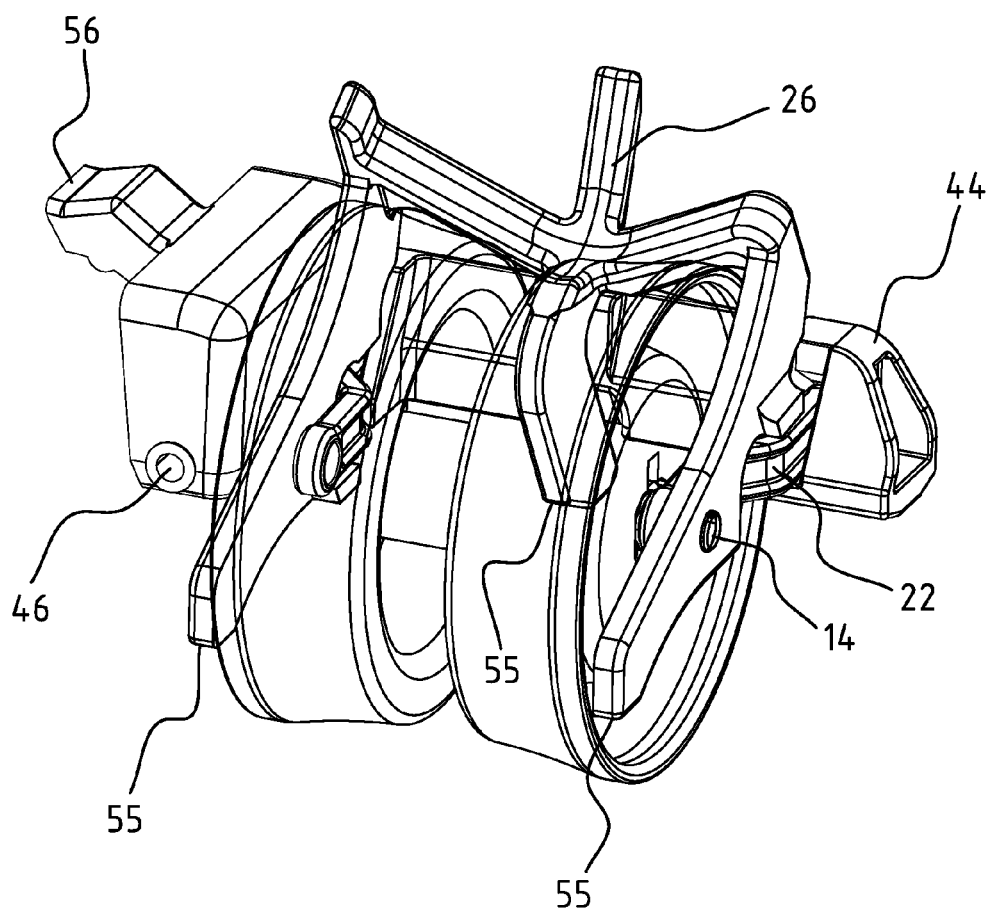

FIG. 5 is a view of the carrier and weighing arm of the device of FIG. 2.

Figure 1:
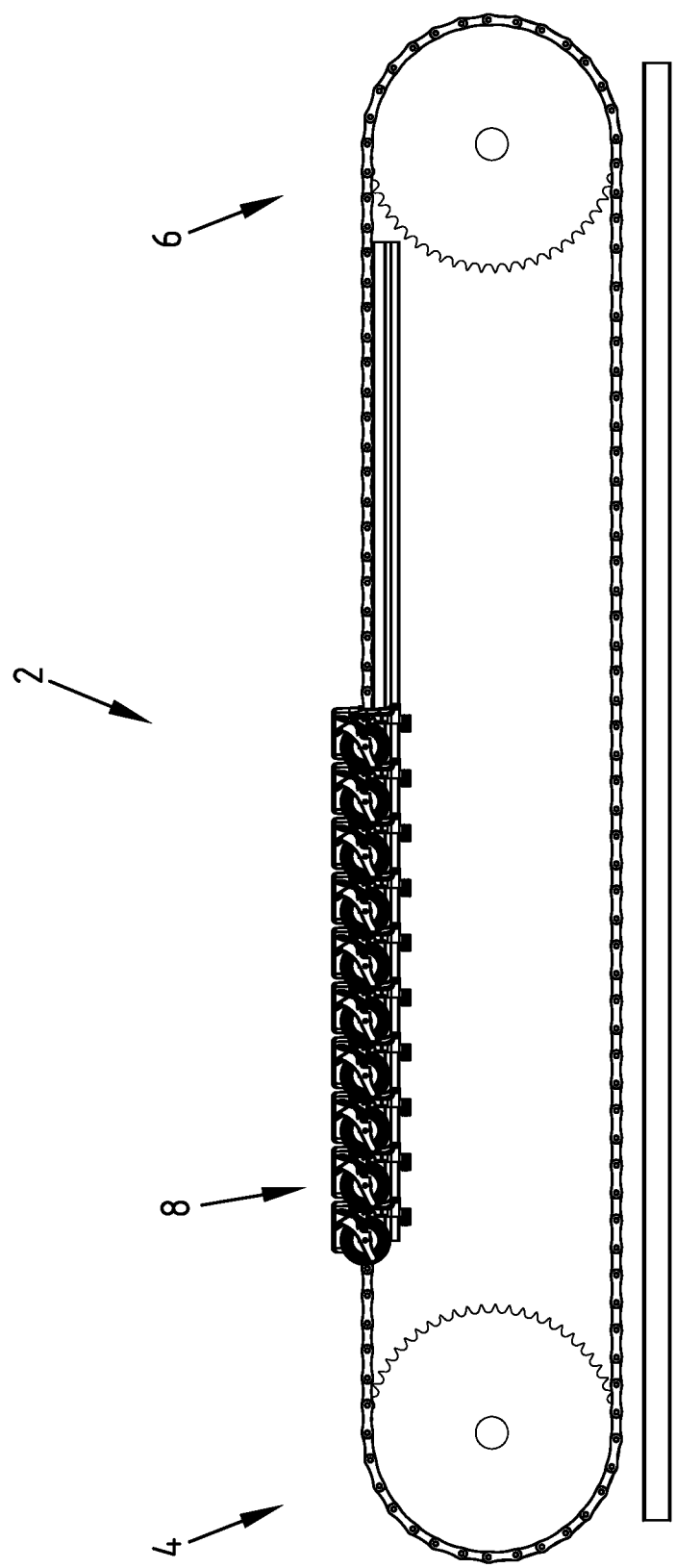
FIG. 1 is a view of a transport line in which the device according to one exemplary embodiment is used.

A transport path 1 (FIG. 1) transports fruits V from a starting position 4 to a release position 6. Device 2 makes use here of transport unit 8.

In the shown embodiment of a row of successive transport units 8 (FIG. 2) a fruit V, for instance an apple or orange, is positioned between two adjacent diabolos 10. A rotation position for fruit V is defined between two adjacent diabolos 10, for instance for a visual inspection. Diabolos 10 are rotatable around rotation shaft 14. Transport units 8 are further provided with a guide arm 16. In the shown embodiment a guide arm 16 is provided on both sides of frame 18 of unit 8. A positioning arm 20 is provided close to guide arm 16.

Figure 3:
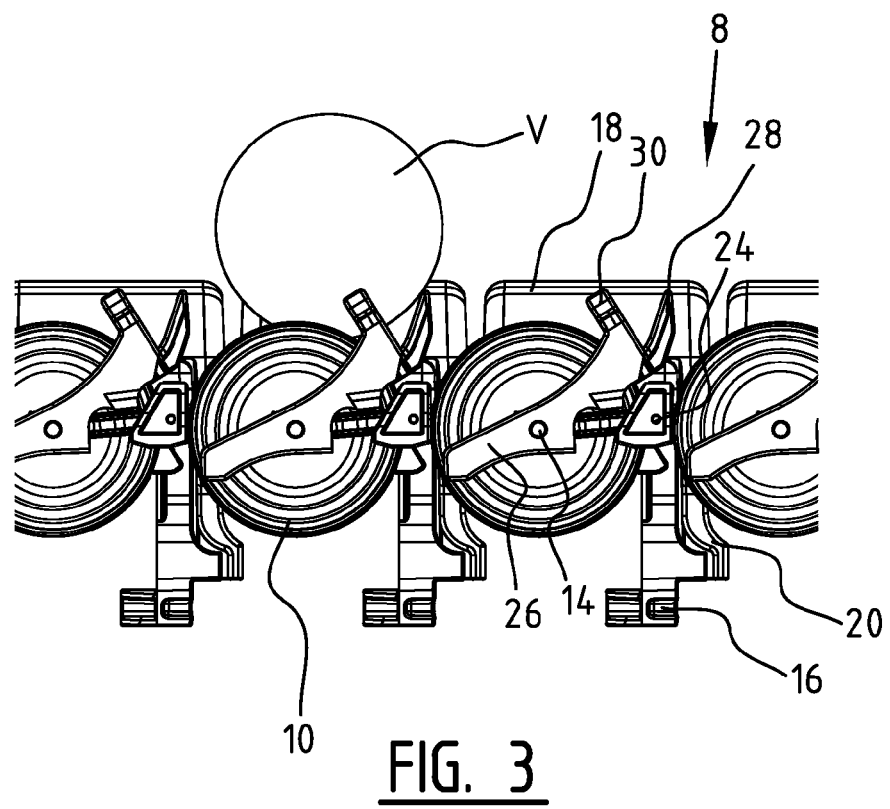
FIG. 3 is a side view of the device of FIG. 2 in a weighing position and transporting position.

For weighing purposes diabolo 10 is placed in a weighing position (FIG. 3). In this position rotation shaft 14 is moved downward relative to frame 18, by means of a rotation movement using pivot arm 22. Pivot arm 22 is connected at one outer end to rotation shaft 14 and connected at another outer end to frame or housing 18. If a weighing has to be carried out, pivot arm 22 is rotated relative to mounting point or mounting shaft 24 on the outer end of pivot arm 22 with which shaft 24 is mounted on frame 18. A weighing frame 26 is further provided for rotation about rotation shaft 14. For weighing purposes weighing frame 26 rotates around rotation shaft 14 such that a number of fingers 28 lift fruit V to some extent out of rotation position 12 such that fruit V rests wholly on diabolo 10. Provided on the side of weighing frame 26 is a support 30 for the purpose of preventing fruit V from rolling off diabolo 10 in lateral direction.

A transport unit 8 (FIG. 4A) provided with a housing or frame 18 is attached around a link 34 of transport chain 36 using a snap mechanism 32. Transport chain 36 moves over track 38 which is provided on the top side with a guide 40 and provided on the sides with guides 42. Pivot arm 22 is connected to rotatable frame part 44 which is mounted on the housing 18 via rotation shaft 46. Housing 18 is provided on the top side with a guard 48. In the shown embodiment transport unit 8 is provided with two tracks with diabolos 10. Extending downward on either side of frame 18 is a guide arm 16 which is releasably connected to positioning arm 20 using tongue 50 on arm 16 and recess 52 in arm 20.

Figure 4B:
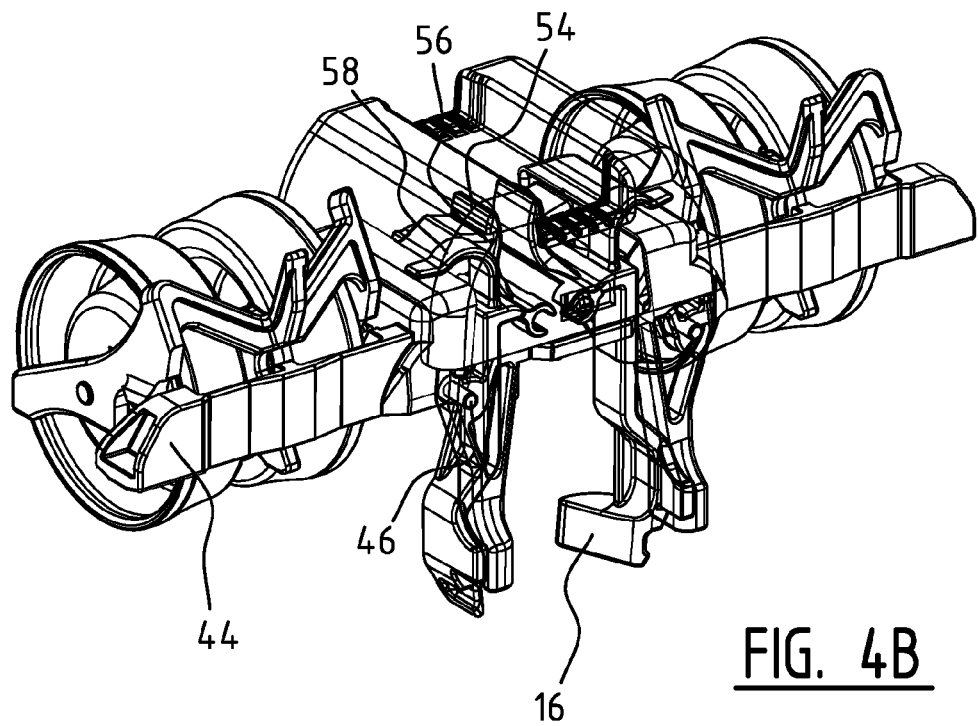
Figure 4C:
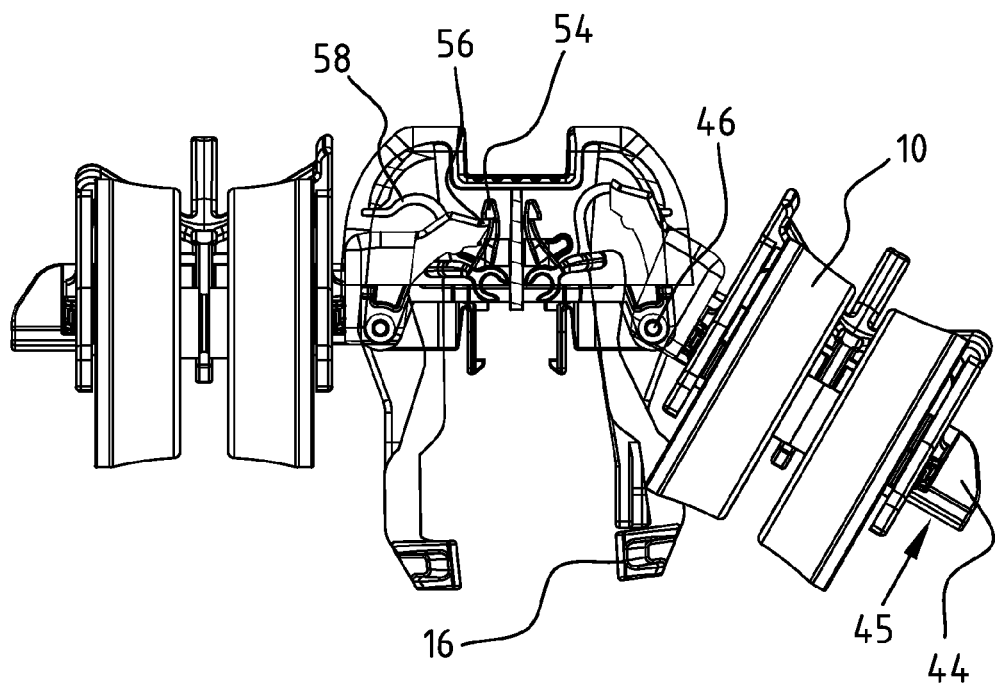

Rotatable frame part 44 is tilted using guide arm 16 (FIGS. 4B and 4C). This is realized by pressing arm 16 sideways so that tongue 54 moves clear of edge 56. Arm 16 is also provided on the top side with a somewhat resilient element 58 with which the tilting of rotatable frame part 44 is initiated. The surface 45 of frame part 44 which is oriented downward during transport is guided over a guide (not shown) for the purpose of increasing the stability of transport unit 8. As a result of the tilting of rotatable frame part 44 about rotation shaft 46 due to guide arm 16 being pushed outward, fruit V will roll off diabolo 10.

In the shown embodiment two pivot arms 22 are provided per rotatable frame part 44 (FIG. 5). Each diabolo 10 is provided here with a weighing frame 26 rotatable around rotation shaft 14 of diabolo 10. For weighing purposes diabolo 10 is moved downward to some extent relative to frame part 44 by rotating pivot arms 22. Weighing frame 26 is also moved such that fruit V is lifted to some extent out of rotation position 12 to the weighing position in which fruit V is carried by a single diabolo 10. Because diabolo 10 can move to some extent in vertical direction relative to frame 18 in the weighing position, diabolo 10 can be carried with weighing frame 26 over a weighing platform (not shown). In the shown embodiment weighing frame 26 is provided here with three slide surfaces or weighing contacts 55 which, during a weighing, come into contact with a weighing platform.

For the purpose of sorting fruits V, a fruit V in the transport path or transport system 2 formed by a number of transport units 8 is for instance visually assessed or weighed during transport using a camera system or weighing platform. The desired release position of fruit V can then be determined using a control system. Transport units 8 can here be mounted as modular unit in a transport path or transport system 2.

For transport of fruits V such as apples, fruits V are brought into a transporting position. In the shown embodiment position 12 is defined between two adjacent diabolos 10. After fruits V have been brought into rotation position 12 the fruit V is measured during transport using a camera system and/or weighing system. This measurement is used to classify fruits V. The desired release position is then determined using the control system. In this way fruits V are transported in simple manner and also assessed and sorted.

The present disclosure is by no means limited to the above described embodiments thereof. The rights sought are defined by the following claims, within the scope of which many modifications can be envisaged. The embodiments disclosed herein can for instance thus be applied for transport and, if desired, sorting of fruits V such as apples and oranges. In addition, it is also possible to apply the device for other types of product. It is possible here to envisage spherical products which for instance have to be tested or assessed.

The invention claimed is:

1. A transport device for transporting products, comprising:
   a frame configured to be operatively connected to a drive system;
   a rotatable carrier means connected to the frame for carrying a product, wherein the carrier means is rotatable about a shaft substantially perpendicular to the direction of transport of the product; and
   a weighing system for weighing the product comprising three sliding elements with which the transport device can be operatively connected to a weighing platform during weighing and wherein the three sliding elements are provided for a three-point weighing, wherein the weighing system and the sliding elements are positioned such that the center of gravity of the product lies substantially centrally within the three sliding elements.

2. The transport device as claimed in claim 1, wherein the frame is provided on each side with a carrier means.

3. The transport device as claimed in claim 1, further comprising a snap mechanism for engaging on the drive system.

4. The transport device as claimed in claim 1, wherein the drive system is provided with an angle of inclination, wherein the angle of inclination lies in the range of 0-15°.

5. The transport device as claimed in claim 1, comprising a camera for detecting or assessing the product.

6. The transport device as claimed in claim 1 further comprising a pivot arm which is connected to the frame and with which a carrier means is movable in a vertical direction relative to the frame.

7. The transport device as claimed in claim 1, comprising a contact element for holding the product on a maximum of one carrier means.

8. The transport device as claimed in claim 1, comprising a release mechanism for releasing the product.

9. The transport device as claimed in claim 8, wherein the release mechanism is provided with a pusher element for stimulating a tilting movement or the purpose of releasing the product.

10. The transport device as claimed in claim 1 further comprising a sorting device for sorting products.

11. The transport device as claimed in claim 10 further comprising a control system for controlling the sorting device.

12. A method for transporting and sorting products, comprising:
   providing a transport device
   providing a frame;
   providing an engaging means connected to the frame for operatively connecting the transport device to a drive system;
   providing a rotatable carrier means connected to the frame for carrying a product, wherein the carrier means are rotatable about a shaft substantially perpendicular to the direction of transport of the product;
   providing a weighing system for weighing the product comprising three sliding elements with which the transport device can be operatively connected to a weighing platform during weighing and wherein the three sliding elements are provided for a three-point weighing, and
   positioning the weighing system and the sliding elements such that the center of gravity of the product lies substantially centrally within the three sliding elements.

13. The method of claim 12 further comprising providing a sorting device.

14. The transport device as claimed in claim 4, wherein the angle of inclination lies in the range of 5-10°.

15. A transport device configured to transport products, comprising:
   a frame;
   a pivot arm connected to the frame configured to connect the transport device to a drive system;
   a carrier having a curved profile connected to the frame configured to carry a product, wherein the carrier is rotatable about a shaft substantially perpendicular to the direction of transport of the product; and
   a weighing system comprising three sliding elements with which the transport device can be operatively connected to a weighing platform during weighing and wherein the three sliding elements are provided for a three-point weighing, wherein the weighing system and the sliding elements are positioned such that the center of gravity of the product lies substantially centrally within the three sliding elements.

16. The transport device as claimed in claim 15, wherein the frame is provided on each side with a carrier.

17. The transport device as claimed in claim 15, wherein the pivot arm is provided with a snap mechanism configured to engage the drive system.

* * * * *